United States Patent Office 2,882,028
Patented Apr. 14, 1959

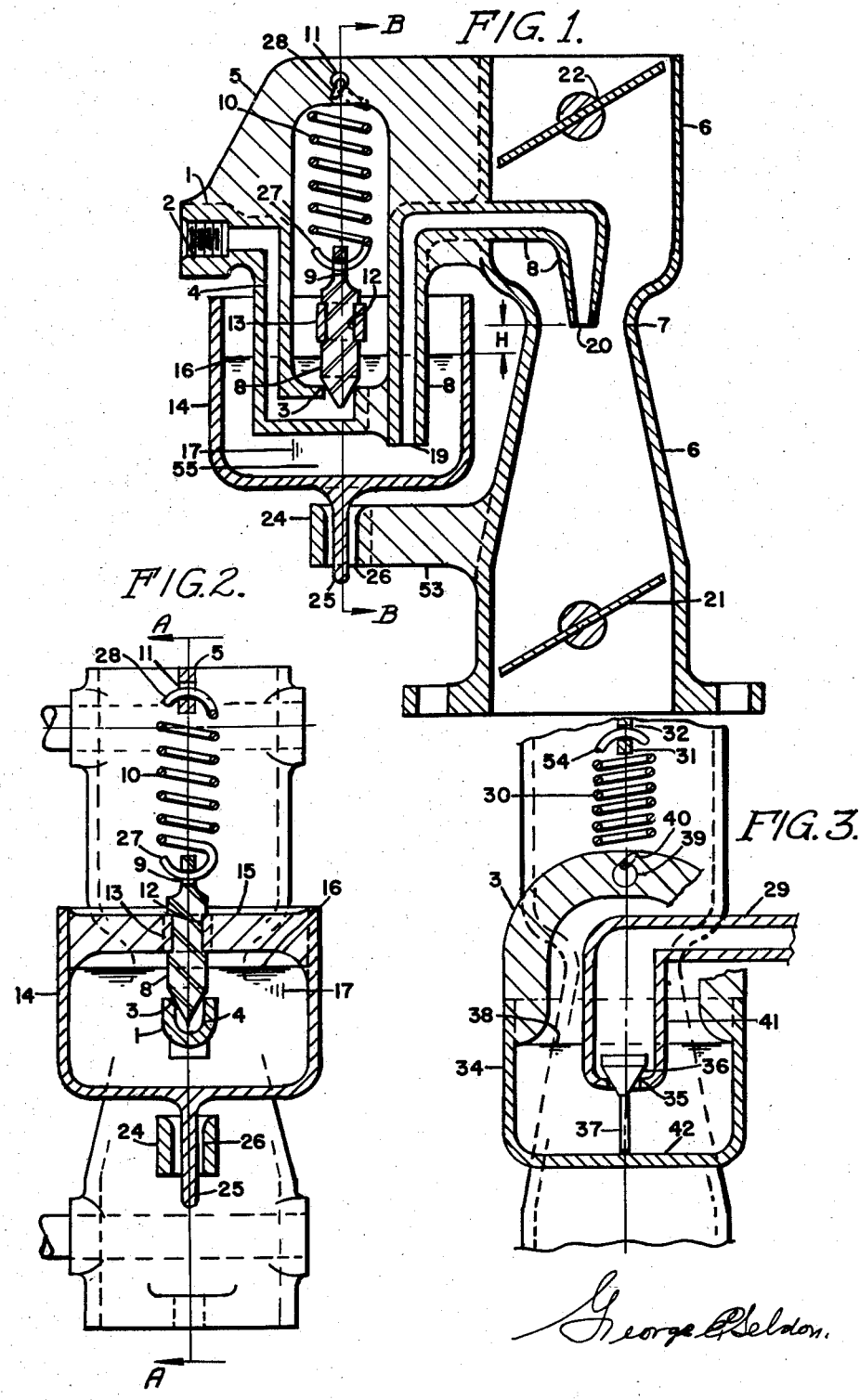

2,882,028

CONSTANT LEVEL MECHANISM FOR CARBURETORS

George E. Seldon, Kirkwood, Mo.

Application April 17, 1956, Serial No. 578,680

11 Claims. (Cl. 261—72)

The object of this invention is to provide a constant level mechanism for carburetors that is simple, effective, and economical to manufacture.

An object of this invention is to provide a constant level mechanism with no fulcrum pins. These pins wear, causing change in the fuel level and malfunctioning of the carburetor.

Another object of this invention is to provide a constant level mechanism that is without friction in the parts, and to provide precise measuring of the forces which hold the head constant on the outlet orifice indefinitely.

Another object is to provide a mechanism that is insulated thermally from the hot metal of the remainder of the carburetor, preventing evaporating of fuel, and percolating after a hot stop.

Another object of this invention is to provide a substantially free pendulous pan and valve pin with an aligning feature to insure proper valve and seat co-operation in spite of shock or angular attitude of the carburetor.

Other objects will be apparent in the following disclosure.

Fig. 1 shows a section view on line A—A of Fig. 2, and illustrates features of one form of the mechanism.

Fig. 2 shows a section view on the line B—B of Fig. 1. This is a section through the pan, fuel inlet control valve, and spring.

Fig. 3 shows another form of this invention, with the pan pendulously and resiliently attached to the body. The section shown is substantially equivalent to Fig. 2, except for the differences shown, and could replace the arrangement at sec. B—B of Fig. 1.

Figure 4:
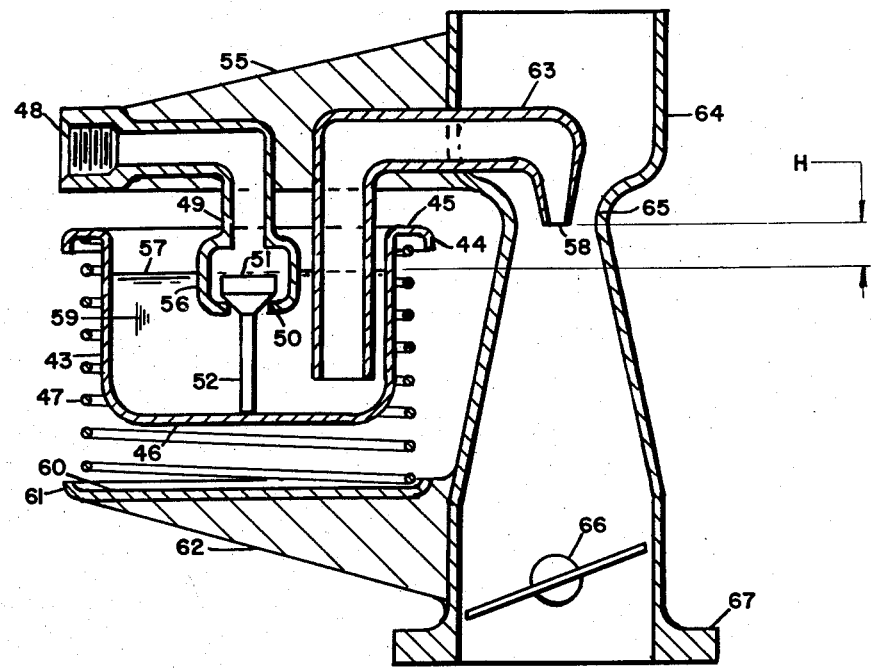

Fig. 4 shows a form of the invention in which the mobile fuel reservoir is resiliently mounted on a compression spring. This gives the reservoir freedom to move in all directions.

Figure 5:
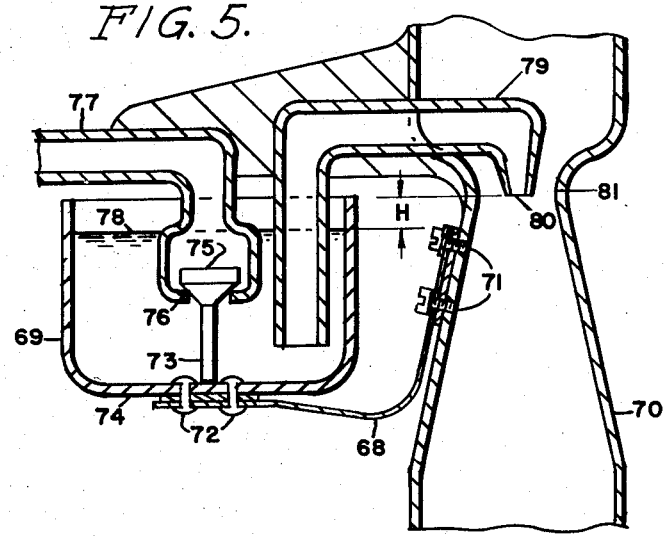

Fig. 5 shows a form of the invention in which the mobile reservoir is supported by a flat leaf spring. This reservoir is free to move up and down, and turn in the picture plane. However, it has limited side motion and limited turning motion in a horizontal plane perpendicular to the valve stem.

This carburetor is fed by fuel from a pump or reservoir and normally it attaches to an engine with air aspirating means. In Figs. 1 and 2 the fuel is admitted through a fitting screwed into the screw boss 2 of the inlet tube 1. The tube 1 is Z-shaped and the outlet end terminates in seat 3. Passage 4 hydraulically connects the inlet and the seat. The tube 1 is attached to the remainder of the carburetor by flange or frame 5 crossing over to the air induction duct 6, which contains a venturi 7.

The seat 3 has a valve 8 fitted and lapped to it to insure tight closure. The valve can be lifted off the seat by at least the radius of the diameter of the clear opening in the seat, and usually substantially more. The amount of lift controls the quantity of fuel flowing, as explained later. At the upper end of the valve 8 a hole 9 is drilled to receive a wire hook 27 of tension spring 10. The other end of the spring is attached to the frame 5 at hole 11.

The valve 8 has an annular groove 12 intermediate its length and at its circumference. This groove 12 receives a ring 13, which supports a deep pan type reservoir 14 through two radial arms 15. The reservoir 14 substantially surrounds the seat and matching valve and so is ideally located to receive and store the fuel delivered through the inlet tube. Reference character 16 indicates the surface of the fuel in the reservoir.

This elevation may remain constant relative to the remainder of the carburetor regardless of the amount of fuel in the reservoir or its vertical position, as will be shown. With the valve just closed, as in Figs. 1 and 2, the preferred predetermined quantity of fuel in the reservoir is indicated. The weight of this quantity of fuel stretches the preferred spring 10 to the point where the valve just touches the seat; that is, the spring supports the reservoir 14 with its arms 15, ring 13 and the valve 8. The spring load is taken at the other end by hook 28 into the frame 5 at hole 11. For quantities of fuel less than the predetermined amount the spring lifts the reservoir assembly with the valve off the seat. The pan type reservoir 14 is shown here with a pin 25 projecting from the bottom of the reservoir. This pin 25 moves freely inside the hole 26 of the ring 24 supported in the position shown by the arm 53. The centerline of the hole coincides with the perpendicular centerline of the pan and spring assembly and passes diametrically through the hole 11. This device holds the reservoir properly aligned at all times regardless of the attitude or motion of the carburetor and insures that the valve aligns properly with the seat.

In Fig. 1 the engine air induction tube 6 has the usual narrowing into a venturi 7, and at this point the fuel outlet nozzle 20 is placed. The fuel outlet tube 18 has its inlet 19 deep in the reservoir near the bottom plate 55. From the venturi 7 and onward the fuel and air blend into a combustible mixture. A throttle valve 21 controls the flow of this mixture of air and fuel into the engine. A choke valve 22 similar to the throttle valve controls the air flow into the induction tube to help start the engine. The surface of the fuel in the reservoir is preferably about ¼" below the outlet nozzle 20. This distance is the head "H" or difference in elevation between the outlet and the surface of the fuel.

The form of the invention shown in Fig. 3 differs from that shown in Fig. 1 mainly in the fuel inlet tube and valve arrangement. The fuel outlet tube and air induction tube are similar to Fig. 1 and are not shown. The fuel inlet tube 29 is pictured as entering from the right. In reality this tube would preferably enter from the same direction as Fig. 1. Then the bail 33 would be shown whole and attached to the reservoir 34 at each side. The tension spring 30 has its upper hook 54 in hole 32 of the frame member 31. This is similar to the arrangement in Fig. 1 where hook 28 of spring 10 engages the hole 11 of frame 5. The outlet tube 18 and air induction tube 6 of Fig. 1 could very well be duplicated for this form of the invention. The bail 33 has a hole 39 at its center for attachment to the loop 40 of the spring 30. The reservoir and bail being symmetrical about the vertical centerline puts the center of gravity of the pan and its contents substantially on this centerline at some point below the hole 39. This line continues vertically through hole 32 also. Since spring 30 is also symmetrical about its centerline, the whole mass—reservoir, and fuel contents—is always statically stable with its centerline substantially vertical and passing through the hole 32 of frame 31.

The reservoir 34 is free to move in any direction from the point shown, but the total excursion from this point is limited by other elements of the carburetor. However there is sufficient freedom to move the valve 36 vertically at least the distance of the radius of the seat opening.

The valve 36 is fitted and lapped to seat 35 and is placed so that it can close the opening. A pin 37 extends from the bottom of the valve to contact the plate 42 closing the bottom of the reservoir. This moves the valve off its seat on vertical motion of the reservoir in an upward direction from the point shown. The pin 37 passes through the seat opening 35 and serves as a guide to keep the valve aligned with the seat. The reservoir may move in the horizontal plane with no effect whatsoever on the valve opening. If the reservoir moves lower than the position shown (valve closed) nothing happens save the spring is stretched more until the bail 33 hits the inlet tube 29 and is stopped.

Fig. 4 discloses another form of the invention, differing in details from the other figures. Here the fuel enters the carburetor (similar to Fig. 1) at a screwed boss 48 of the fuel inlet tube 49, which turns vertically downward and terminates at a seat 50, which has a circular opening in a horizontal plane. The tube 49 is attached to the carburetor through frame 55. A bulbous expansion 56 of the downwardly projecting part of tube 49 houses the inlet valve 51.

Fig. 4 discloses a cylindrical type reservoir 43 with a radial circular ring 45 at the top. The ring is bounded at the outer rim by an annular hoop 44 projecting downward. The bottom of the cylindrical reservoir is closed by a circular plate 46. A compression spring 47 engages the lower surface of the ring 45.

The valve 51 is fitted and lapped to the seat 50 to insure closure. The inlet valve 51 has a stem 52 projecting downward from its pointed end similar to the valve arrangement of Fig. 3. The stem 52 touches the bottom plate normally and is the link connecting the reservoir with the valve. It is part of the means whereby vertical motion of the reservoir actuates the valve controlling the flow of fuel into the carburetor. Note that purely horizontal motion of the reservoir has little effect on the vertical travel of the valve which is required for a different hydraulic setting.

The surface of the fuel is indicated at 57. When the valve is just closed it also indicates the desired predetermined quantity of fuel 59 that compresses the spring 47 to the just closed valve position and the valve is open for all weights of fuel less than the predetermined quantity.

The spring 47 is a compression spring. Its upper end supports the reservoir and in turn is supported at the bottom by platform 60 which shows a bounding annular lip 61 projecting upwardly to keep the spring in proper position. The platform 60 is framed into the carburetor by means of beam 62. The rate of spring is preferably substantially the rate of increase of weight of fuel in the reservoir in pounds per inch of height. This arrangement assures the constancy of the head of fuel on the orifice, as will be shown.

The outlet tube 63 is similar to that of Fig. 1. The air induction tube is shown as 64 with its venturi 65. A butterfly throttle valve is shown at 66 and bolt flanges at 67.

Fig. 5 shows a form of the invention similar in many respects to Fig. 4. Here a flat spring 68 supports the reservoir 69 from the venturi 70. The spring is attached to the venturi by screws 71, and rivets 72 fasten it to the reservoir 69. The valve stem 73 rests on the floor 74 of the reservoir. The valve 75 rests on seat 76, closing the fuel inlet tube 77. Fuel fills the reservoir to line 78. Fuel leaves the reservoir through outlet tube 79, which terminates in a nozzle 80, which is located at the throat 81 of the venturi 70.

In Fig. 1, the fuel is considered to be admitted under pressure from a pump or higher tank, neither of which is shown.

If the reservoir is empty at the beginning of operations, the spring 10 will have lifted the reservoir, radial arm, and valve assembly and the valve will not be seated. Now, fuel under pressure from the pump or tank passes through the inlet passage 4 to the seat and past it because the valve is off the seat (open). This fuel falls into the reservoir 14 filling it. As the reservoir fills, the weight of fuel in it increases proportionately. If the spring rate (lbs. load per inch of stretch) equals that of the reservoir (lbs. of fuel per inch of height) then any increase in weight is accompanied by a definite rise of fuel in the reservoir which is just matched by an equivalent lengthening of the spring holding the top surface of the fuel a constant distance "H" below the outlet nozzle 20. That is, any increment of fuel depth in the reservoir is the result of an equivalent increment of weight of fuel in it and this is matched by a proportional increment in the length of the supporting spring, and a corresponding change in the setting of the valve. Since the carburetor is used on motor cars, the attitude of the carburetor is constantly changing, conforming to the slope of the road.

The reservoir is cylindrical and symmetrical about a vertical centerline. The valve 8 is also placed along this centerline; consequently the center of gravity will fall substantially upon the centerline depending on the precision with which the reservoir was made and assembled with the other units. The spring can be considered symmetrical about its own centerline. Hence, if the reservoir and spring are permitted to swing about the hole 11 they will always come to rest with the centerline of the reservoir substantially perpendicular and running through the centerline of the spring and diametrically through the hole 11, as shown by section line B—B, that is, the fuel loaded reservoir is always statically stable as long as no forces other than gravity are applied. It is not necessary for static stability that the mass of the spring, reservoir and fuel contents, valve and radial arms, be all uniformly and equally distributed about their common vertical centerline, as here shown and described. A mass of any shape having free pendulous motion about a pivot above its center of gravity will always come to rest with its center of gravity directly under the pivot point, and the structure is statically stable, as long as no forces other than gravity are applied. The symmetrical shape is convenient, easy to make and comprehend, so it is the preferred shape. But the invention is not to be construed as limited to a reservoir of this shape. If the symmetrical reservoir is unconstrained by external contacts, the centerline through it is always vertical regardless of carburetor attitude. This assures valve 8 proper alignment with seat 3. In the event of considerable angular displacement of the carburetor, the valve on closing might not find the seat and land outside tube 1 with a resultant loss of flow control. Hence a pin 25 is placed along the vertical centerline through the reservoir at the bottom. This pin passes through hole 26 of the ring 24. This arrangement centers the reservoir assembly regardless of carburetor attitude and suddenly applied forces. As air is aspirated through the induction tube 6, its velocity increases as it passes the venturi 7. This increase in velocity is accompanied by a loss of head (Bernoulli) hence the pressure is lowered here and the fuel flows out of the nozzle 20. The air and fuel flowing together in a common passage, mix. The rate of flow is controlled by a throttle valve 21 placed at the outlet of the induction tube. This regulates the mixture flow rate by turning the butterfly valve in one direction to restrict or choke the passage, and in the other to remove the restriction. With the valve plate in the flat horizontal position across the tube, it is entirely closed, and in the vertical position the tube is open and comparatively unrestricted. The rate of fuel flow out of the nozzle 20 is substantially proportional to the rate of air flow through the induction tube, which was indicated to be a function of throttle valve position.

The rate (quantity of fuel per unit of time) that fuel flows out of the nozzle is identical to the rate of fuel flow in outlet tube 18 and out of the reservoir through opening 19. The rate of fuel flow out of the reservoir must be the same as the rate of fuel flow into the reservoir if the reservoir is to continue in stable equilibrium. Assuming this to be true, then there is a valve opening that just permits the desired rate of fuel flow since the velocity of flow past the seat and complementary valve is a function of head or pressure on fuel entering the carburetor. Now, assume the throttle to be opened. More air passes the venturi, lowering the pressure still more, and fuel flows out of the nozzle 20 at a new and greater rate. This new increased rate of flow draws the fuel out of the reservoir faster than it is being introduced and the weight of fuel in the reservoir decreases. Now the spring 10 senses (feels) this and lifts the reservoir, opening the valve and increasing the rates of fuel flow into the reservoir. As shown previously, since the rates of the spring and fuel in the reservoir are similar, no change in "H" or fuel head occurs. The position of the reservoir has changed, but the level of fuel relative to the outlet remains constant. The valve has opened, in demand for a higher rate of fuel delivery.

If now the throttle is closed some, the rate of air flow past the venturi is lowered and pressure differential across the outlet tube lowers, so less fuel flows out of the reservoir, but the rate of flow in remains constant and the additional fuel accumulates in the reservoir. This accumulation of fuel in the reservoir increases its weight, stretching the spring and closing the valve. Differences in rates of flow in and out of the reservoir are thus automatically compensated without outside attention. This is all accomplished while the head "H" on the nozzle remains constant.

Note in Fig. 1 that without pin 25 and valve 8 off the seat the reservoir is completely mobile in all directions and angular displacements. Excursions from the initial position are limited in distance by interfering structure and spring loads. In Figs. 3, 4, and 5, the valve and seat interference is reduced.

In the embodiment of Figs. 1 and 2, assume the reservoir filled and the valve closed and little or no fuel removed. Assume lint or other obstruction causing a leak in the seat and valve, so that fuel flows in faster than it is removed. The top surface must rise and the weight of fuel in the reservoir will increase. This increase in weight is not absorbed by the spring because it cannot stretch farther to pick up additional load. So the additional weight is passed onto the seat by the valve 8, tending to close the valve. If the obstruction is resilient, the valve may close to the point where the fuel level stops rising in the reservoir.

In the embodiment shown in Fig. 3, the fuel enters under some inlet pressure due to pump or tank. At the beginning, if there is no fuel in the cylindrical reservoir, the spring will have lifted the reservoir and the valve 51 off the seat by means of the stem 52. The valve will be lifted off the seat a distance greater than the radius of the seat 50. Assuming no fuel flow out of the reservoir, as fuel fills the reservoir the weight or load increases and the spring must stretch to balance it. Here again the spring rate should be substantially the same as the fuel rate. As the spring elongates under load the valve approaches the seat and eventually, with continued flow into the reservoir, the valve seats and flow stops. An accidental leak here would result in further accumulation of fuel in the reservoir and the increase in weight would elongate the spring still more and plate 42 would recede from the valve stem 37. However, here no additional load is placed on the pin to compress the obstruction causing the leak, and thereby tending to restrict or stop the leak.

The spring 30 like 10 is a tension spring and attaches to the frame 31 above it. The spring transfers its load to the frame 31 at hole 32. Functionally the arrangement of Fig. 3 could replace that of Fig. 2. Note the stem 37 attached to the valve 36 passes through the seat and acts as a guide to insure that the valve approaches the seat in an attitude that permits the valve to close the opening.

Fig. 4 is also a form of this invention, but uses a compression spring 47 instead of a tension spring, as in the other figures. The fuel flow and valving is similar to that shown in Fig. 3. The stem 52 of the valve 51 merely rests on the bottom plate 46 of the reservoir 43. With its attached valve 51, the stem 52 moves up and down because of vertical motion of the reservoir, above the position shown in Fig. 4. Note this reservoir has freedom to move in all directions and is permitted rotation too. Only upward motion (from position shown) actuates the valve, however. The minimum upward excursion of the reservoir from the position shown (valve closed) required to open the valve fully is the length of the smallest radius of the opening of the seat. This spring 47 also can well have a rate similar to that of the fuel in the reservoir.

Fig. 5 discloses a constant level mechanism similar to that of Fig. 4, except that it has a flat leaf spring instead of a coiled compression spring. The spring rate again, as far as possible, equals the fuel rate in the reservoir, at least at the full point as shown in Fig. 5. As before, if fuel is removed out of the outlet tube the reservoir lightens and the spring pushes it and the valve upward so that fuel reenters the reservoir.

I claim:

1. In a carburetor, a frame and an air induction tube with a venturi, a fuel inlet tube terminating in a seat with a complementary control valve therefor, a reservoir mobile relative to said frame, said reservoir adapted for receiving and storing the fuel, an outlet tube delivering the fuel from the reservoir to the venturi said outlet tube depending from said frame and a spring carrying the weight of the reservoir, fuel contents and inlet valve directly into the frame, said reservoir being substantially cylindrical with a vertical axis; the seat and complementary valve substantially concentric with the axis of said reservoir and means whereby vertical motion of said reservoir actuates said valve.

2. In a carburetor, a frame with an attachment point, an air induction tube having a venturi, a fuel inlet tube ending in a seat and a complementary control valve therefor, a cylindrical reservoir mobile in all directions relative to said frame, said reservoir to receive and store the incoming fuel and has a vertical axis and a floor; depending from said frame a tube to remove the fuel from the reservoir and deliver it to the venturi, said valve and seat substantially concentric with the reservoir, said mobile reservoir pendulously suspended from the attachment point in the frame by elastic means such as a spring, a stem on said valve, said stem contacting the floor of said reservoir whereby the fuel inlet control valve is actuated with respect to the seat in response to vertical motion of the reservoir.

3. In a carburetor, a frame with a platform, an air induction tube having a venturi, a fuel inlet tube ending in a seat and a complementary valve therefor mobile vertically and horizontally, relative to said frame a reservoir to receive and store the fuel delivered through the inlet tube depending from said frame, a tube to remove the fuel from the reservoir and deliver it to the venturi, a columnar spring supporting said reservoir on said platform and means whereby said valve is actuated by the motion of said reservoir.

4. In a carburetor, a frame, an air induction tube and a venturi therein, a fuel inlet tube ending in a seat with a complementary valve therefor, relative to said frame, a mobile reservoir circumjacent the valve and seat to receive and store the fuel, means to remove the fuel from the reservoir and deliver it to the venturi, elastic means supporting said reservoir on said frame, means whereby motion of said reservoir actuates said valve, and said elastic means of such elasticity as to permit a range of valve settings from full open to closed for a corresponding weight change of fuel in the reservoir of none to a full charge.

5. In a carburetor, a frame, an air induction tube and a venturi therein, a fuel inlet tube terminating in a seat, a complementary control valve therefor, a reservoir having means to receive and store the fuel, said reservoir mobile in vertical and horizontal directions relative to the frame, said reservoir having means to actuate said control valve, means to remove fuel from the reservoir and deliver it to the venturi, an elastic member supporting said reservoir in said frame, said member of such elasticity as to permit a predetermined change in the linear setting of the valve by a predetermined change of weight of fuel in the reservoir.

6. In a carburetor, a frame, an air induction tube and a venturi therein, a fuel inlet tube terminating in a seat, a complementary control valve therefor, a reservoir having means to receive and store the fuel, said reservoir mobile in vertical and horizontal directions relative to the frame, said reservoir having means to actuate said control valve, means as a tube depending from said frame and said means adapted to remove fuel from the reservoir and deliver it to the venturi, an elastic member supporting said reservoir on said frame, said member of such elasticity as to permit a given increment of valve setting travel by a predetermined increment of fuel weight in said reservoir.

7. In a carburetor, a body having a venturi, a fuel inlet passage in said body, a valve to control the flow of fuel therethrough, a reservoir movable vertically and horizontally relative to said body and adapted to receive the fuel from said passage and to store it, a tube with one end in the fuel in the reservoir and the other end in the venturi for removing fuel from the reservoir, and a spring between said body and said reservoir biasing said valve open whereby said valve is open for all weights of fuel remaining in the reservoir below a predetermined amount and closed for all weights above said amount.

8. In a carburetor, a body, a venturi, a fuel inlet passage, a seat terminating said passage, a reservoir to receive and store the fuel admitted through said passage and seat, a valve attached to said reservoir and cooperable with said seat to regulate the fuel flow into the reservoir, a tube to remove fuel from the reservoir and deliver it to the venturi, leaving a remainder of fuel in the reservoir; supporting said reservoir a spring so proportioned as to lift the reservoir with its remaining fuel and attached valve off the seat for any remainder of fuel less than a predetermined amount and not to lift the reservoir with a fuel remainder equal to or greater than the predetermined amount, whereby the valve is open for the remainder of fuel in the reservoir less than the predetermined amount and closed for the remainder equal to or greater than the predetermined amount.

9. In a carburetor, a frame with a fuel inlet passage, a seat terminating this passage, a complementary valve to control the fuel flow past the seat, a reservoir mobile relative to said frame, said reservoir circumjacent the valve and seat, said reservoir pendulously attached to said frame by a spring, means whereby said valve is actuated by motion of said reservoir and means whereby said valve is guided onto the seat regardless of carburetor attitude.

10. In a carburetor, an air induction tube having a venturi, a body with a fuel inlet passage, a seat in the fuel inlet passage, a complementary control valve therefor, a reservoir mobile relative to said body, said reservoir circumjacent the valve and seat to store the fuel, said valve attached to said reservoir, a pin on said reservoir, a guide on the body, a resilient link pendulously attaching said reservoir directly to said frame, means whereby motion of said reservoir actuates said valve and said pin engaging said guide to insure valve engagement with the seat regardless of carburetor attitude.

11. In a carburetor, a body with an air induction passage and a venturi therein, a fuel inlet tube with a valve and seat to control the flow of fuel therethrough, movable relative to said body a pan to receive and store the fuel from said inlet tube, means whereby motion of said pan actuates said valve on said seat to regulate the rate of fuel flowing into the pan, a pipe to conduct fuel from said pan and deliver it to the venturi, a variable weight of fuel remaining in the pan due to independently varying inflow and outflow rates, a spring supporting said pan with its variable remainder of fuel on said body, said spring proportioned so as to bias the valve shut for all remaining weights of fuel equal to and greater than a predetermined weight and bias it open for all remaining weights of fuel less than the predetermined weight.

References Cited in the file of this patent

UNITED STATES PATENTS

| | | |
|---|---|---|
| 527,005 | Roblin | Oct. 2, 1894 |
| 804,083 | Bade | Nov. 7, 1905 |
| 2,107,573 | Langdon et al. | Feb. 8, 1938 |
| 2,141,365 | Schuttler | Dec. 27, 1938 |
| 2,430,719 | Johnson et al. | Nov. 11, 1947 |
| 2,651,321 | McBride | Sept. 8, 1953 |
| 2,695,029 | Bruegger | Nov. 23, 1954 |